US012651149B2

(12) United States Patent
Park et al.

(10) Patent No.: US 12,651,149 B2
(45) Date of Patent: Jun. 9, 2026

(54) NEURAL NETWORK COMPUTATION APPARATUS HAVING SYSTOLIC ARRAY

(71) Applicant: SK hynix Inc., Icheon (KR)

(72) Inventors: Yong Sang Park, Icheon (KR); Joo Young Kim, Icheon (KR); Young Jae Jin, Icheon (KR)

(73) Assignee: SK hynix Inc., Icheon (KR)

( * ) Notice: Subject to any disclaimer, the term of this patent is extended or adjusted under 35 U.S.C. 154(b) by 1305 days.

(21) Appl. No.: 17/151,561

(22) Filed: Jan. 18, 2021

(65) Prior Publication Data

US 2021/0319291 A1      Oct. 14, 2021

(30) Foreign Application Priority Data

Apr. 10, 2020      (KR) ........................ 10-2020-0044192

(51) Int. Cl.
| | |
|---|---|
| *G06N 3/063* | (2023.01) |
| *G06F 17/16* | (2006.01) |
| *G06N 3/044* | (2023.01) |

(52) U.S. Cl.
CPC ............. G06N 3/063 (2013.01); G06F 17/16 (2013.01); G06N 3/044 (2023.01)

(58) Field of Classification Search
CPC ......... G06N 3/063; G06N 3/044; G06F 17/16
USPC ........................................................ 706/30
See application file for complete search history.

(56) References Cited

U.S. PATENT DOCUMENTS

| | | |
|---|---|---|
| 2019/0179869 A1 | 6/2019 | Park et al. |
| 2020/0027001 A1 | 1/2020 | Yoo et al. |
| 2020/0134417 A1* | 4/2020 | Mohapatra ............. G06N 3/045 |
| 2020/0160150 A1* | 5/2020 | Hashemi ............. G06F 12/0284 |

(Continued)

FOREIGN PATENT DOCUMENTS

| | | |
|---|---|---|
| CN | 107239825 A | 10/2017 |
| CN | 108615072 A | 10/2018 |

(Continued)

OTHER PUBLICATIONS

Efficient Implementations of Sparse and Quantized Deep Neural Networks using Systolic Arrays (Year: 2019); Bradley; p. 9, p. 12.*

(Continued)

*Primary Examiner* — Van C Mang
*Assistant Examiner* — Andrew Bracero

(57) ABSTRACT

A neural network computation apparatus includes a first processing block including a plurality of processing units that each perform a matrix multiplication operation on input data and weights, and a second processing block including a plurality of element-wise operation processing groups. The element-wise operation processing group selectively perform a first neural network computation operation and a second neural network computation operation. The first neural network computation operation comprises the matrix multiplication operation on the input data and the weights and an activation operation on a result value of the matrix multiplication operation, and the second neural network computation operation comprises an activation operation on the result value of the matrix multiplication operation, which is transferred from the first processing block, and an element-wise operation.

16 Claims, 10 Drawing Sheets

(56) References Cited

U.S. PATENT DOCUMENTS

| | | | | |
|---|---|---|---|---|
| 2020/0175355 A1* | 6/2020 | Chung | ............... | G06F 15/8046 |
| 2022/0327434 A1* | 10/2022 | John | ...................... | G06N 20/20 |

FOREIGN PATENT DOCUMENTS

| | | |
|---|---|---|
| CN | 109901572 A | 6/2019 |
| CN | 110705703 A | 1/2020 |
| KR | 1020170126997 A | 11/2017 |
| KR | 1020180025125 A | 3/2018 |
| KR | 10-2019-0030564 A | 3/2019 |
| KR | 10-2019-0074195 A | 6/2019 |
| WO | 2019/075267 A1 | 4/2019 |

OTHER PUBLICATIONS

ESE: Efficient Speech Recognition Engine with Sparse LSTM on FPGA (Year: 2017); Han; p. 79, p. 75.*

Efficient Implementations of Sparse and Quantized Deep Neural Networks using Systolic Arrays; Bradley; p. 9, p. 12 (Year: 2019).*

ESE: Efficient Speech Recognition Engine with Sparse LSTM on FPGA; Han; p. 79, p. 75 (Year: 2017).*

Shawahna et al., "FPGA-based Accelerators of Deep Learning Network for Learning and Classification: A Review" (Year: 2018).*

Wang et al., "Systolic Arrays for Lattice-Reduction-Aided MIMO Detection" (Year: 2011).*

Song Han et al., "ESE : Efficient Speech Recognition Engine with Sparse LSTM on FPGA," ACM/SIGDA, 2017, pp. 75-84.

Bradley W. Mcdanel, "Efficient Implementations of Sparse and Quantized Deep Neural Networks using Systolic Arrays," Doctoral dissertation, Harvard University, 2019.

Han, et. al, "ESE: Efficient Speech Recognition Engine with Sparse LSTM on FPGA", arXivLabs, Feb. 2017.

Lee, et. al, "FPGA-based Low-power Speech Recognition with Recurrent Neural Networks", 2016 IEE International Workshop on Signal Processing Systems, 2016.

* cited by examiner

NEURAL NETWORK COMPUTATION APPARATUS HAVING SYSTOLIC ARRAY

CROSS-REFERENCES TO RELATED APPLICATION

The present application claims priority under 35 U.S.C. § 119(a) to Korean application number 10-2020-0044192, filed on Apr. 10, 2020, in the Korean Intellectual Property Office, which is incorporated herein by reference in its entirety.

BACKGROUND

1. Technical Field

Various embodiments generally relate to a neural network computation apparatus, and particularly, to a neural network computation apparatus having a systolic array.

2. Related Art

Neural networks are machine learning models using at least one nonlinear unit layer so as to predict output for received input. Some neural networks include at least one hidden layer in addition to an output layer.

The output of each hidden layer is used as input for a next layer of a network, that is, a next hidden layer or output layer. Each layer of a network generates output from received input according to current values of respective parameter sets. Some neural networks, such as neural networks designed for time series problems or inter-sequence learning (for example, recurrent neural networks (RNN)), include recurrent loops that allow a memory to persist in a layer between data inputs in the form of a hidden state variable.

Long short-term memory (LSTM) neural networks, which are modified RNNs, include multiple gates in each layer so as to control data persistence between data inputs. Some neural networks, such as neural networks designed for time series problems or inter-sequence learning, include recurrent loops that allow a memory to persist in a layer between data inputs in the form of a hidden state variable.

The LSTM neural network uses a matrix multiplication operation and an element-wise operation. A systolic array may efficiently perform the matrix multiplication operation, but may be less useful for the element-wise operation. Therefore, the systolic array may include a separate dedicated element-wise operation block.

In such a case, when the systolic array executes other neural networks that uses no element-wise operation, such as a multi-layer perceptron (MLP) or a convolutional neural network (CNN), resources of the element-wise operation block are wasted.

SUMMARY

Various embodiments are directed to providing a neural network computation apparatus having a systolic array, in which an element-wise operation is possible.

In an embodiment, a neural network computation apparatus may include: a first processing block including a plurality of processing units that each perform a matrix multiplication operation on input data and weights; and a second processing block including a plurality of element-wise operation processing groups. The element-wise operation processing group selectively perform a first neural network computation operation and a second neural network computation operation. The first neural network computation operation comprises the matrix multiplication operation on the input data and the weights and an activation operation on a result value of the matrix multiplication operation, and the second neural network computation operation comprises an activation operation on the result value of the matrix multiplication operation, which is transferred from the first processing block, and an element-wise operation.

In an embodiment, a neural network computation apparatus may include: a systolic array in which a plurality of processing units that output an operation result for input data and weights are arranged in a matrix form. The systolic array may include: a plurality of first processing units each configured to perform a matrix multiplication operation on the input data and the weights; and a plurality of second processing units each configured to perform one operation selected from the matrix multiplication operation on the input data and the weights and an element-wise operation on output data transferred from the plurality of first processing units.

In accordance with an embodiment, since an element-wise operation is possible in a systolic array, there is no need to separately provide a dedicated block for the element-wise operation, so that resource waste does not occur.

BRIEF DESCRIPTION OF THE DRAWINGS

FIG. 6B is a timing diagram illustrating operation of the element-wise operation processing group when an element-wise operation is performed.

FIG. 7A illustrates an example in which no element-wise operation is performed in the element-wise operation processing group.

DETAILED DESCRIPTION

Hereinafter, an embodiment of the present disclosure will be described in detail with reference to the drawings.

Figure 1:
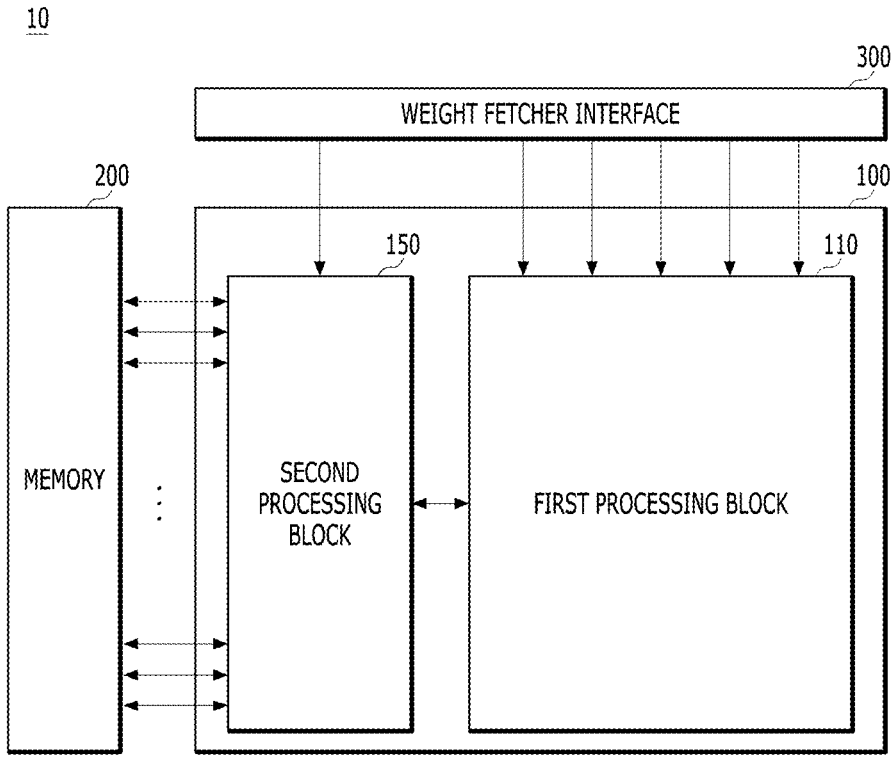
FIG. 1 illustrates a structure of a neural network computation apparatus in accordance with an embodiment.

FIG. 1 is a diagram illustrating a structure of a neural network computation apparatus 10 in accordance with an embodiment.

Referring to FIG. 1, the neural network computation apparatus 10 in accordance with the present embodiment may include a systolic array 100, a memory 200, and a weight fetcher interface 300.

The systolic array 100 may include a first processing block 110 and a second processing block 150.

Figure 2:
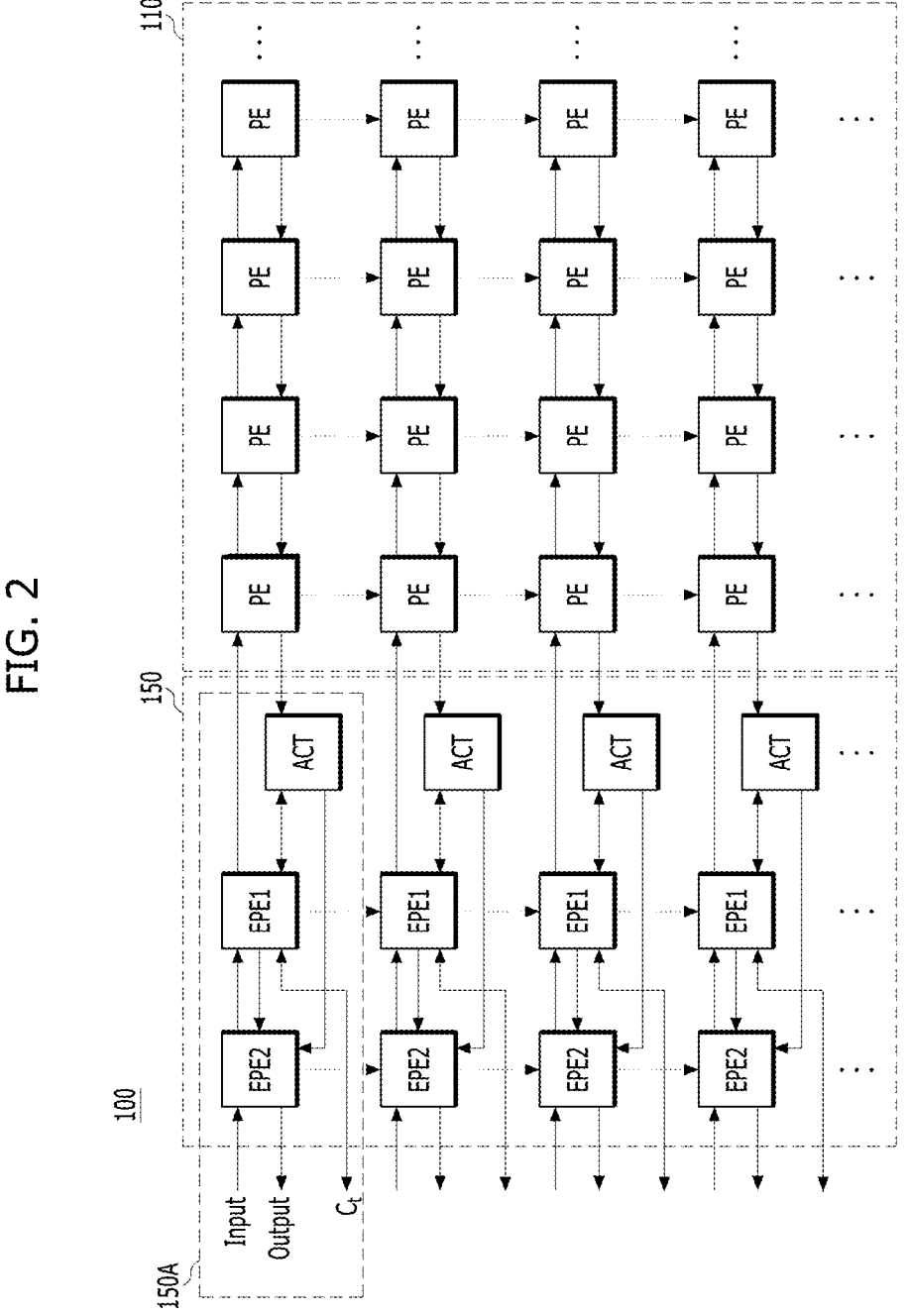
FIG. 2 illustrates a configuration of a systolic array of FIG. 1.

The first processing block 110 may include a plurality of processing units (PEs) as shown in FIG. 2. Each of the plurality of processing units may perform a respective matrix multiplication operation on respective weights and respective input data. The plurality of processing units may be disposed in a two-dimensional matrix form. Each of the plurality of processing units may transfer input data it receives, which is transferred from the memory 200, to a processing unit adjacent in a row direction, and transfer weights it receives, which are inputted through the weight fetcher interface 300, to a processing unit adjacent in a column direction.

The second processing block 150 may include a plurality of element-wise operation processing groups 150A, as shown in FIG. 2. Each of the plurality of element-wise operation processing groups may respectively perform an activation operation, an element-wise operation, or both on respective output data transferred from the first processing block 110. A detailed configuration of each of the first processing block 110 and the second processing block 150 of the systolic array 100 will be described in detail below with reference to FIG. 2.

The memory 200 may be configured to store input data that are transferred to the systolic array 100, and output data that are transferred from the systolic array 100. Furthermore, the memory 200 may store a cell state value of each of the processing units included in the first processing block 110 of the systolic array 100. Furthermore, the memory 200 may store weights that are inputted to the systolic array 100.

The weight fetcher interface 300 may fetch the weights stored in the memory 200 and transfer the fetched weights to the processing units in the systolic array 100. For example, the weight fetcher interface 300 may transfer the weights to processing units located at the uppermost row among the processing units disposed in the two-dimensional matrix form.

FIG. 2 is a diagram illustrating a configuration of the systolic array 100 in accordance with the present embodiment.

Referring to FIG. 2, the systolic array 100 may include the first processing block 110 and the second processing block 150.

The first processing block 110 may include the plurality of processing units PEs arranged in a two-dimensional matrix form. Each of the processing units PEs may receive input data from a processing unit PE located on the left side thereof, and transfer output data to a processing unit PE located on the right side thereof. Furthermore, each of the processing units PEs may transfer a weight to a processing unit PE located therebelow.

The first processing block 110 may have more columns than rows, more rows than columns, or substantially the same number of rows and columns. The first processing block 110 may perform matrix multiplication operations on input data and weights by using the plurality of processing units PEs, and transfer operation results to the second processing block 150.

The second processing block 150 may include a plurality of element-wise operation processing units EPE1 and EPE2 and a plurality of activation units ACTs. The plurality of element-wise operation processing units EPE1 and EPE2 may include first element-wise operation processing units EPE1 and second element-wise operation processing units EPE2. In the present embodiment, a collection of one first element-wise operation processing unit EPE1, one second element-wise operation processing unit EPE2, and one activation units ACT is referred to as an element-wise operation processing group 150A.

The second processing block 150 may include a plurality of element-wise operation processing groups 150A. As illustrated in FIG. 2, the plurality of element-wise operation processing groups 150A may be disposed in the column direction. The number of the plurality of element-wise operation processing groups 150A may be substantially the same as the number of the rows of the first processing block 110. For example, each of the plurality of element-wise operation processing groups 150A may process output data transferred from a processing unit PE located at a corresponding row in the first processing block 110.

The element-wise operation processing groups 150A of the second processing block 150 may be configured to selectively perform element-wise operations according to the type of a neural network algorithm executed in the neural network computation apparatus 10.

For example, when the neural network computation apparatus 10 executes a neural network algorithm requiring no element-wise operation, that is, a neural network algorithm such as a multi-layer perceptron (MLP) or a convolutional neural network (CNN), the second processing block 150 may performs only the activation operation on output data transferred from the first processing block 110.

On the other hand, when the neural network computation apparatus 10 executes a neural network algorithm requiring the element-wise operation, that is, a neural network algorithm such as a long short-term memory (LSTM), the second processing block 150 may perform both the activation operation and the element-wise operation on output data transferred from the first processing block 110.

When the second processing block 150 performs no element-wise operation, the element-wise operation processing group 150A may operate as follows.

The first element-wise operation processing unit EPE1 of the element-wise operation processing group 150A may transfer input data Input to a processing unit PE located on the leftmost side thereof among the processing units PEs disposed in a corresponding row of the first processing block 110. For example, the first element-wise operation processing unit EPE1 may transfer the input data Input, which is transferred from the memory 200 (FIG. 1), to a corresponding processing unit PE located on the leftmost side thereof among the processing units PEs in the first processing block 110. In an embodiment, the input data Input may be transferred from the memory 200 to the second element-wise operation processing unit EPE2, and may be transferred from the second element-wise operation processing unit EPE2 to the first element-wise operation processing unit EPE1.

Furthermore, the first element-wise operation processing unit EPE1 may transfer output data, which is transferred from a processing unit PE located on the leftmost side thereof in a corresponding row of the first processing block 110, to the second element-wise operation processing unit EPE2. The second element-wise operation processing unit EPE2 may transfer the output data, which is transferred from the first element-wise operation processing unit EPE1, to the activation unit ACT, and the activation unit ACT may transfer activated output data to the memory 200.

Furthermore, the first element-wise operation processing units EPE1 and the second element-wise operation processing units EPE2 may receive the weights through the weight fetcher interface 300. The first element-wise operation processing units EPE1 may transfer the weights to first element-wise operation processing units EPE1 therebelow, respectively. The second element-wise operation processing units EPE2 may transfer the weights to second element-wise operation processing units EPE2 therebelow, respectively.

That is, when the second processing block 150 performs no element-wise operation, the first element-wise operation processing units EPE1 and the second element-wise operation processing units EPE2 of the element-wise operation processing group 150A may operate in substantially the same manner as the processing units PEs in the first processing block 110.

Meanwhile, when the second processing block 150 performs the element-wise operation, the element-wise operation processing group 150A may operate as follows.

The first element-wise operation processing units EPE1 and the second element-wise operation processing units EPE2 of the element-wise operation processing groups 150A transfer the input data transferred from the memory 200 to the processing units PEs in the first processing block 110, in substantially the same manner as described above.

The activation unit ACT may perform activation operations on the output data transferred from the processing units PEs in the first processing block 110, and transfer activated output data to both the first element-wise operation processing unit EPE1 and the second element-wise operation processing unit EPE2.

The first element-wise operation processing unit EPE1 of the element-wise operation processing group 150A may receive a cell state value $C_t$ from the memory 200. For example, a cell state value that is transferred to the first element-wise operation processing unit EPE1 may be a previous cell state value calculated by the first element-wise operation processing unit EPE1 in a previous step and stored in the memory 200. For example, the first element-wise operation processing unit EPE1 may perform the element-wise operation by using the previous cell state value transferred from the memory 200 and the activated output data transferred from the activation unit ACT, thereby calculating a current cell state value.

The first element-wise operation processing unit EPE1 may transfer the current cell state value to both the memory 200 and the activation unit ACT. Furthermore, the activation unit ACT may transfer an activated current cell state value to the second element-wise operation processing unit EPE2.

The second element-wise operation processing unit EPE2 may calculate a final output value by performing the element-wise operation on the activated output data transferred from the activation unit ACT and the current cell state value, and transfer the calculated final output value to the memory 200.

That is, when the second processing block 150 performs the element-wise operation, the first element-wise operation processing units EPE1 and the second element-wise operation processing units EPE2 of the element-wise operation processing groups 150A may operate differently from the processing units PEs in the first processing block 110, except for an operation of transferring input data.

Detailed configuration and operation method of the element-wise operation processing group 150A of the second processing block 150 will be described in detail below with reference to FIG. 5, FIG. 6A, FIG. 6B, FIG. 7A, and FIG. 7B.

Figure 3A:
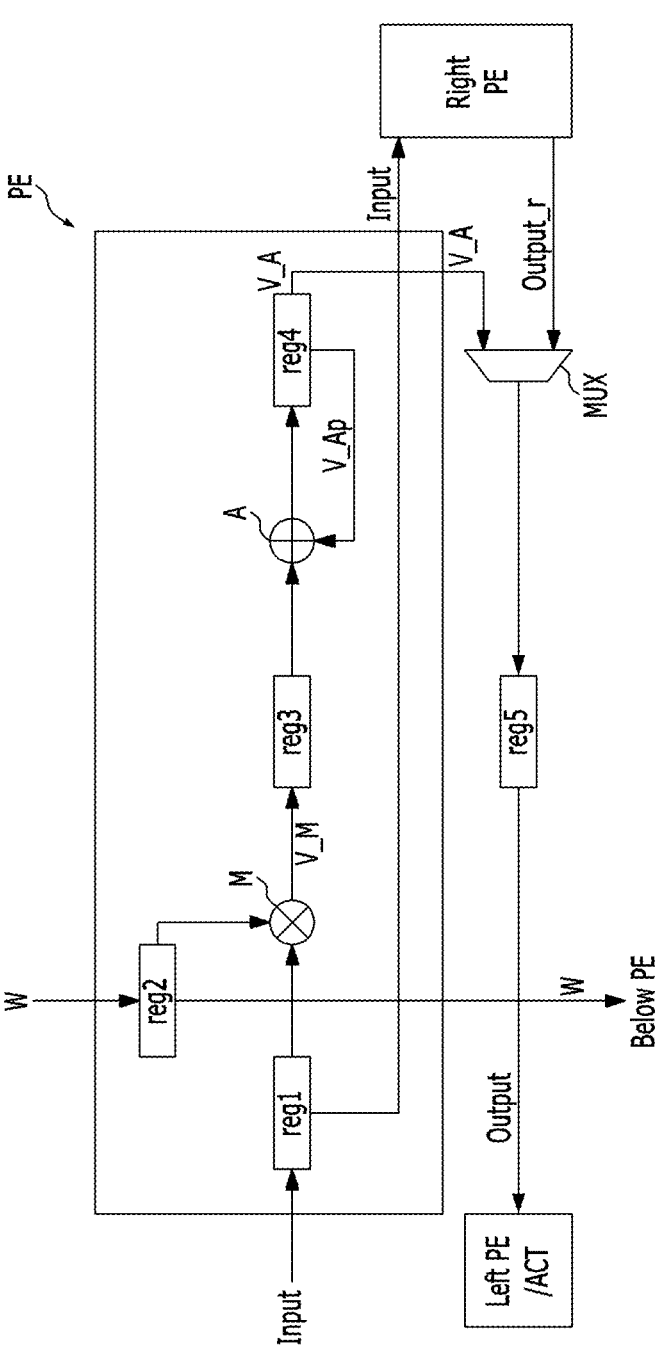
FIG. 3A illustrates a structure of a processing unit.

FIG. 3A is a diagram illustrating a configuration of the processing unit PE.

The processing unit PE may include first to fifth registers reg1 to reg5, a multiplier M, and an adder A.

The first register reg1 may store the input data Input and provide the input data Input to the multiplier M. In addition, the first register reg1 may provide the input data Input to a processing unit right PE located on the right side thereof. The second register reg2 may store a weight W and provide the weight W to the multiplier M and a processing unit below PE therebelow.

The multiplier M may perform a multiplication operation on the input data Input provided from the first register reg1 and the weight W provided from the second register reg2, and provide a multiplication result value V_M to the third register reg3.

The third register reg3 may store the multiplication result value V_M provided from the multiplier M, and provide the multiplication result value V_M to the adder A. The adder A may perform an addition operation on the multiplication result value V_M transferred from the third register reg3 and a previous addition result value V_Ap fed back from the fourth register reg4, and provide an addition result value V_A to the fourth register reg4. The fourth register reg4 may store the addition result value V_A provided from the adder A, and provide the addition result value V_A to a multiplexer MUX. In addition, the fourth register reg4 may feed the addition result value V_A back to the adder A as the previous addition result value V_Ap.

The multiplexer MUX may provide, to the fifth register reg5, one of output data Output_r transferred from the processing unit right PE located on the right side thereof and the addition result value V_A produced by the adder A and provided to the multiplexer MUX by the fourth register reg4.

The fifth register reg5 may provide the value transferred from the multiplexer MUX to a processing unit left PE located on the left side thereof or the activation unit ACT as final output data Output.

Figure 3B:
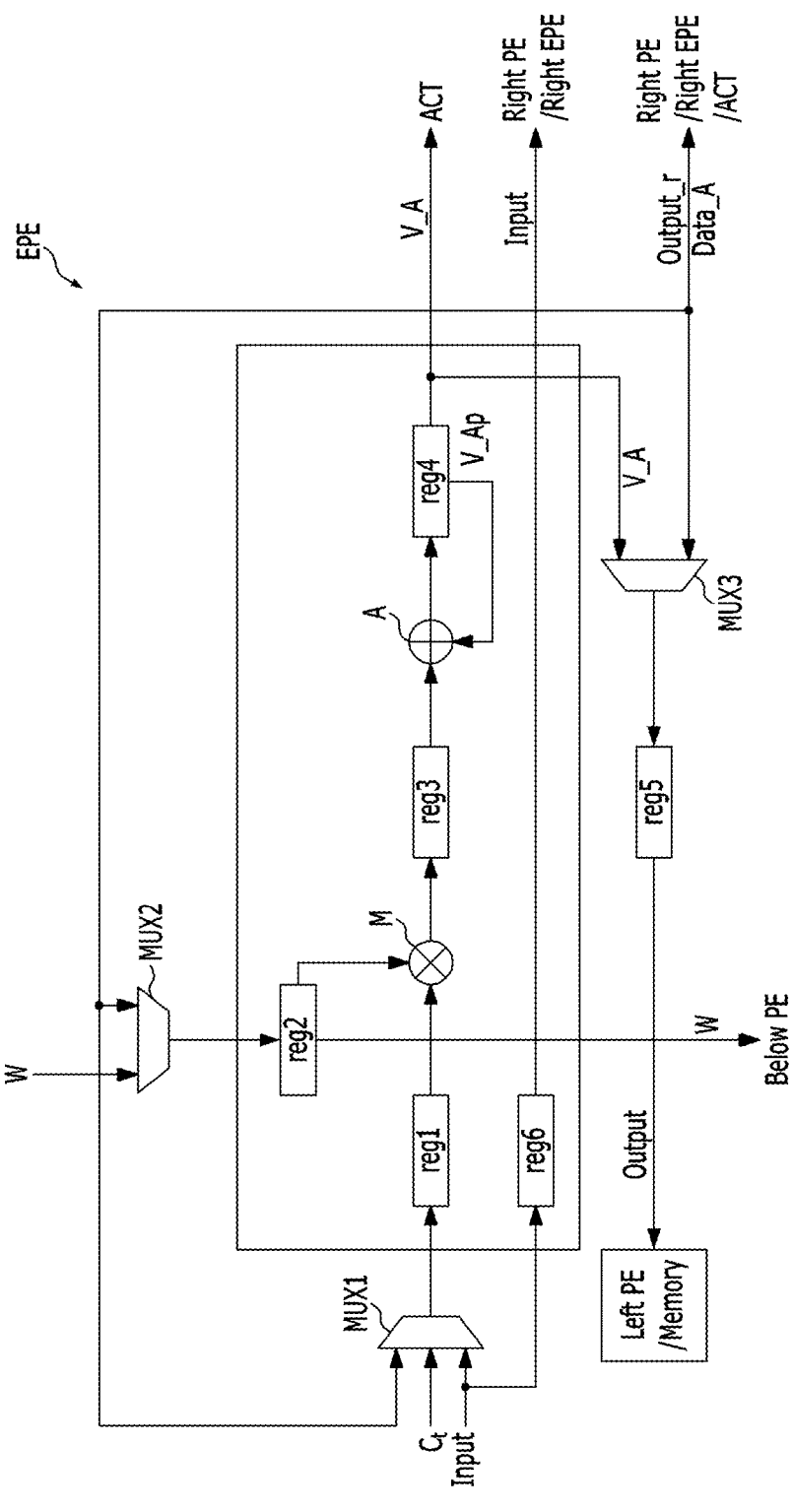
FIG. 3B illustrates a structure of an element-wise operation processing unit in accordance with an embodiment.

FIG. 3B is a diagram illustrating a structure of the element-wise operation processing unit EPE in accordance with an embodiment. In describing the structure of the element-wise operation processing unit EPE with reference to FIG. 3B, a description of substantially the same configuration as that described in FIG. 3A will be omitted.

The element-wise operation processing unit EPE may include first to third multiplexers MUX1 to MUX3.

The first multiplexer MUX1 may select one of the input data Input, the cell state value $C_t$ transferred from the memory 200, and a third data comprising either the output data Output_r provided from a processing unit right PE or an element-wise operation processing unit right EPE located on the right side of the element-wise operation processing unit EPE or activated data Data_A provided from the activation unit ACT. The first multiplexer MUX1 may then output the selected one to a first register reg1. In an embodiment, whether the third data is the output data Output_r or the activated data Data_A may be determined by a multiplexer within the element-wise operation processing group 150A but outside the element-wise operation processing unit EPE (such as multiplexers 153 and 154 shown in FIG. 5).

The second multiplexer MUX2 may select one of the weight W and a second data comprising either the output data Output_r transferred from the processing unit right PE or an element-wise operation processing unit right EPE located on the right side of the element-wise operation processing unit EPE or the activated data Data_A transferred from the activation unit ACT. The second multiplexer MUX2 may then output the selected one to a second register reg2.

The input data Input may be inputted to the first multiplexer MUX1 and simultaneously provided to the sixth register reg6. The sixth register reg6 may then provide the input data Input to the processing unit right PE located on the right side of the element-wise operation processing unit EPE. Furthermore, the addition result value V_A stored in a fourth register reg4 may be fed back to an adder A as the previous addition result value V_Ap, and provided to both the activation unit ACT and the third multiplexer MUX3.

For example, when the element-wise operation processing unit EPE performs the element-wise operation, the first multiplexer MUX1 may select the cell state value $C_t$ and transfer the cell state value $C_t$ to the first register reg1, and may sequentially transfer a plurality of data activated by the activation unit ACT to the first register reg1.

When the element-wise operation processing unit EPE performs no element-wise operation, the element-wise operation processing unit EPE may operate in substantially the same manner as the processing unit PE illustrated in FIG. 3A, for example, by having the first multiplexer MUX1 select the input data Input, having the second multiplexer MUX2 select the weight W, and having the third multiplexer MUX3 operate in the manner of the multiplexer MUX of FIG. 3A.

Figure 4:
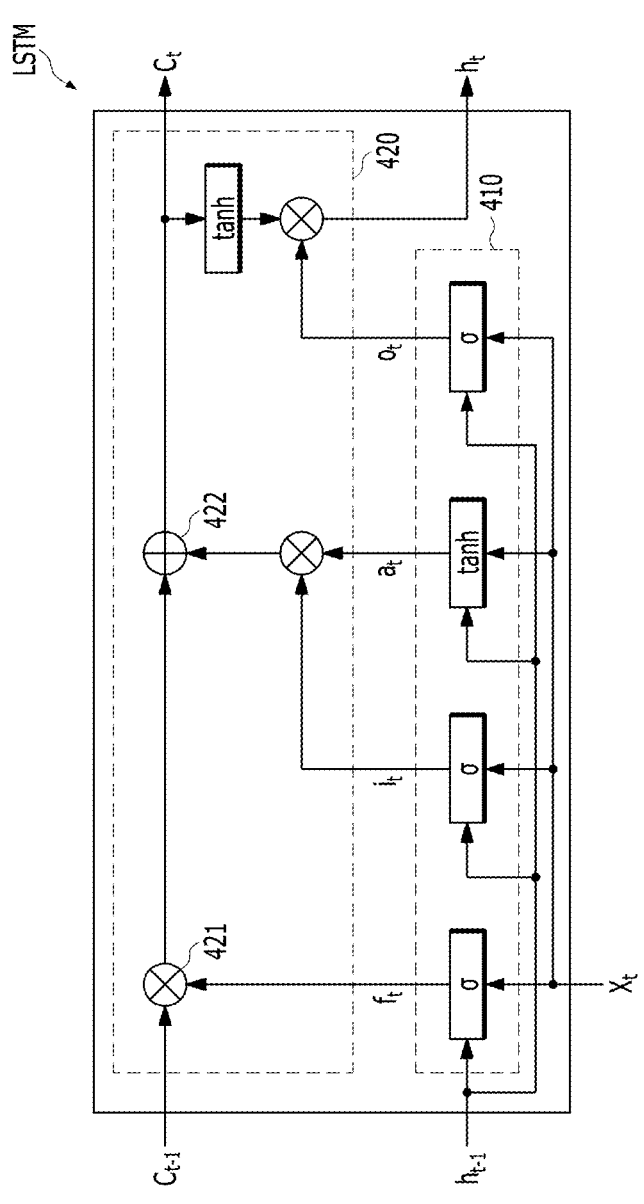
FIG. 4 illustrates a structure of a long short-term memory (LSTM) neural network algorithm such as may be performed in an embodiment.

FIG. 4 is a diagram illustrating a structure of the long short-term memory (LSTM) neural network algorithm that may be performed by an embodiment.

Referring to FIG. 4, the LSTM neural network algorithm may roughly include an activation operation portion 410 and an element-wise operation portion 420. In the present embodiment, the activation operation portion 410 may correspond to operations performed in an activation unit of an embodiment. Furthermore, the element-wise operation portion 420 may correspond to operations performed in one or more element-wise operation processing units of an embodiment.

The activation operation portion 410 may calculate four values, that is, '$f_t$', '$i_t$', '$a_t$', and '$o_t$' by using a sigmoid function and a hyperbolic tangent (tanh) function based on an input value $X_t$ and a previous final output value $h_{t-1}$ (corresponding to the hidden state of the previous step). Furthermore, the '$f_t$' may indicate a value for determining information to be discarded from a previous cell state value $C_{t-1}$. The '$i_t$' may indicate a value for determining information to be stored in a cell state value among inputted information. The '$a_t$' may indicate candidate values to be stored in the cell state value. The '$o_t$' may indicate a value for determining a value to be finally outputted from the current cell state value $C_t$.

The element-wise operation circuit 420 may update the previous cell state value $C_{t-1}$ to calculate the current cell state value $C_t$. For example, the element-wise operation circuit 420 may perform element multiplication of the previous cell state value $C_{t-1}$ and the '$f_t$' and discard some information from the previous cell state value $C_{t-1}$. Then, by adding a result value of element multiplication of the '$i_t$' and the '$a_t$' to the previous cell state value $C_{t-1}$ from which some information has been discarded, the updated cell state value, that is, the current cell state value $C_t$ may be calculated.

Furthermore, the element-wise operation circuit 420 may determine a final output value $h_t$ (corresponding to the hidden state for this step). For example, the element-wise operation circuit 420 may determine, as the final output value $h_t$, a result value of a hyperbolic tangent (tanh) operation on the calculated current cell state value $C_t$ and a result value of element multiplication of the '$o_t$'.

As described above, the LSTM neural network algorithm uses the matrix multiplication operation and the element-wise operation. The systolic array in the related art efficiently performs the matrix multiplication operation, but is less useful for the element-wise operation. Therefore, in the related art, the systolic array separately includes a dedicated block for the element-wise operation. Accordingly, when the systolic array executes other neural networks using no element-wise operation, such as a multi-layer perceptron (MLP) and a convolutional neural network (CNN), resources of the element-wise operation block are wasted.

In this regard, in the present embodiment, as illustrated in FIG. 1 and FIG. 2, the systolic array 100 includes the first processing block 110 that performs the matrix multiplication operation and the second processing block 150 that is connected to the first processing block 110 and performs the element-wise operation. The second processing block 150 is configured to selectively perform one of the element-wise operation and the matrix multiplication operation according to the needs of the application being performed.

Figure 5:
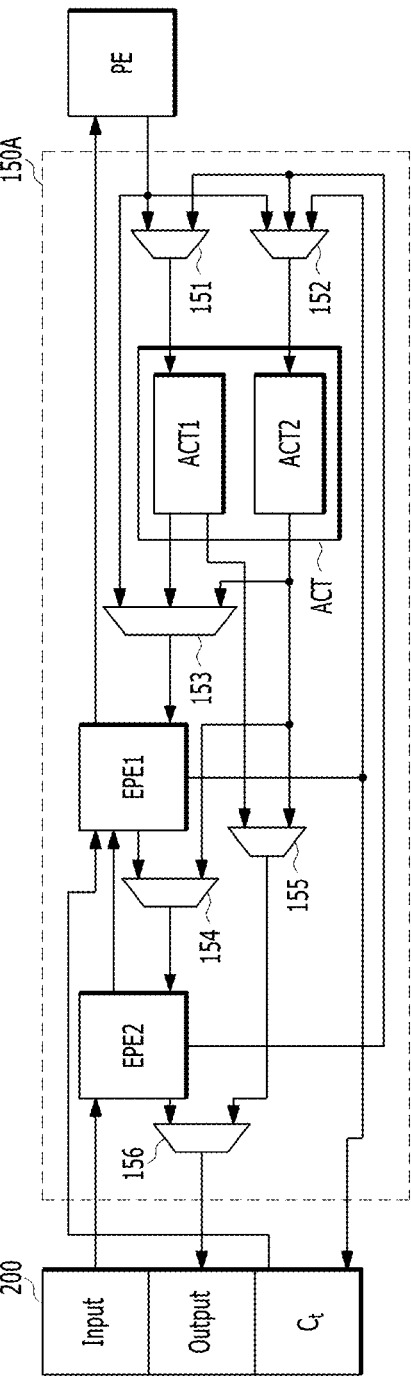
FIG. 5 illustrates a structure of an element-wise operation processing group in accordance with an embodiment.

FIG. 5 is a diagram illustrating a configuration of the element-wise operation processing group 150A in accordance with an embodiment. The element-wise operation processing group 150A of FIG. 5 is capable of supporting operations of a LSTM neural network, such as the operations shown in FIG. 4.

Referring to FIG. 5, the element-wise operation processing group 150A in accordance with the present embodiment may include one first element-wise operation processing unit EPE1, one second element-wise operation processing unit EPE2, one activation unit ACT, and first to sixth multiplexers 151 to 156. The activation unit ACT may include a first activation subunit ACT1 and a second activation subunit ACT2. For example, the first activation subunit ACT1 may be a sigmoid function and the second activation subunit ACT2 may be an arc tangent function, but the present disclosure is not particularly limited thereto.

The first multiplexer 151 may select one of output data provided from an adjacent processing unit PE (for example, a processing unit PE located on the right side of the element-wise operation processing group 150A) and data provided from the addition result value V_A of the second element-wise operation processing unit EPE2, and provide the selected data to the first activation subunit ACT1.

The second multiplexer 152 may select one of the output data provided from the processing unit PE located on the right side thereof, the data provided from the addition result value V_A of the second element-wise operation processing unit EPE2, and a cell state value (for example, a current cell state value) provided from the addition result value V_A of the first element-wise operation processing unit EPE1, and transfer the selected one to the second activation subunit ACT2.

The third multiplexer 153 may select one of the output data transferred from the processing unit PE located on the right side of the element-wise operation processing group 150A, first activated data provided from the first activation subunit ACT1, and second activated data provided from the second activation subunit ACT2, and provide the selected one to the Output_r/Data_A input (shown in FIG. 3B) of the first element-wise operation processing unit EPE1.

The fourth multiplexer 154 may select one of the second activated data provided from the second activation subunit ACT2 and data provided from the first element-wise operation processing unit EPE1, and provide the selected one to the Output_r/Data_A input of the second element-wise operation processing unit EPE2.

The fifth multiplexer 155 may select one of the first activated data provided from the first activation subunit ACT1 and the second activated data provided from the second activation subunit ACT2, and provide the selected one to the sixth multiplexer 156.

The sixth multiplexer 156 may select one of the data provided from the fifth multiplexer 155 and the data provided from the Output (shown in FIG. 3B) of the second element-wise operation processing unit EPE2, and provide the selected one to the memory 200.

Figure 6A:
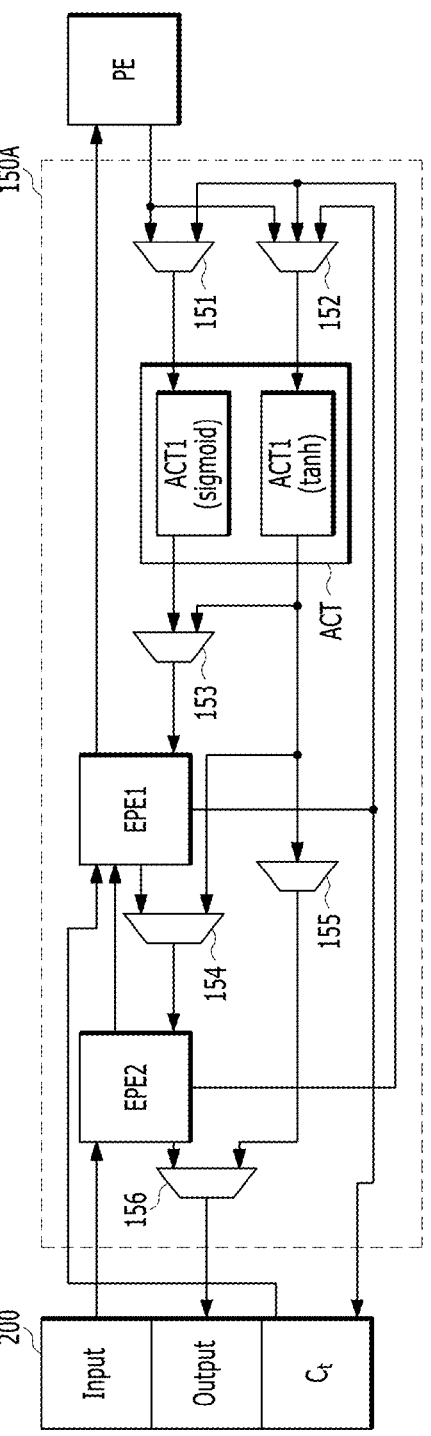
FIG. 6A illustrates an example in which an element-wise operation is performed in the element-wise operation processing group.
Figure 6B:
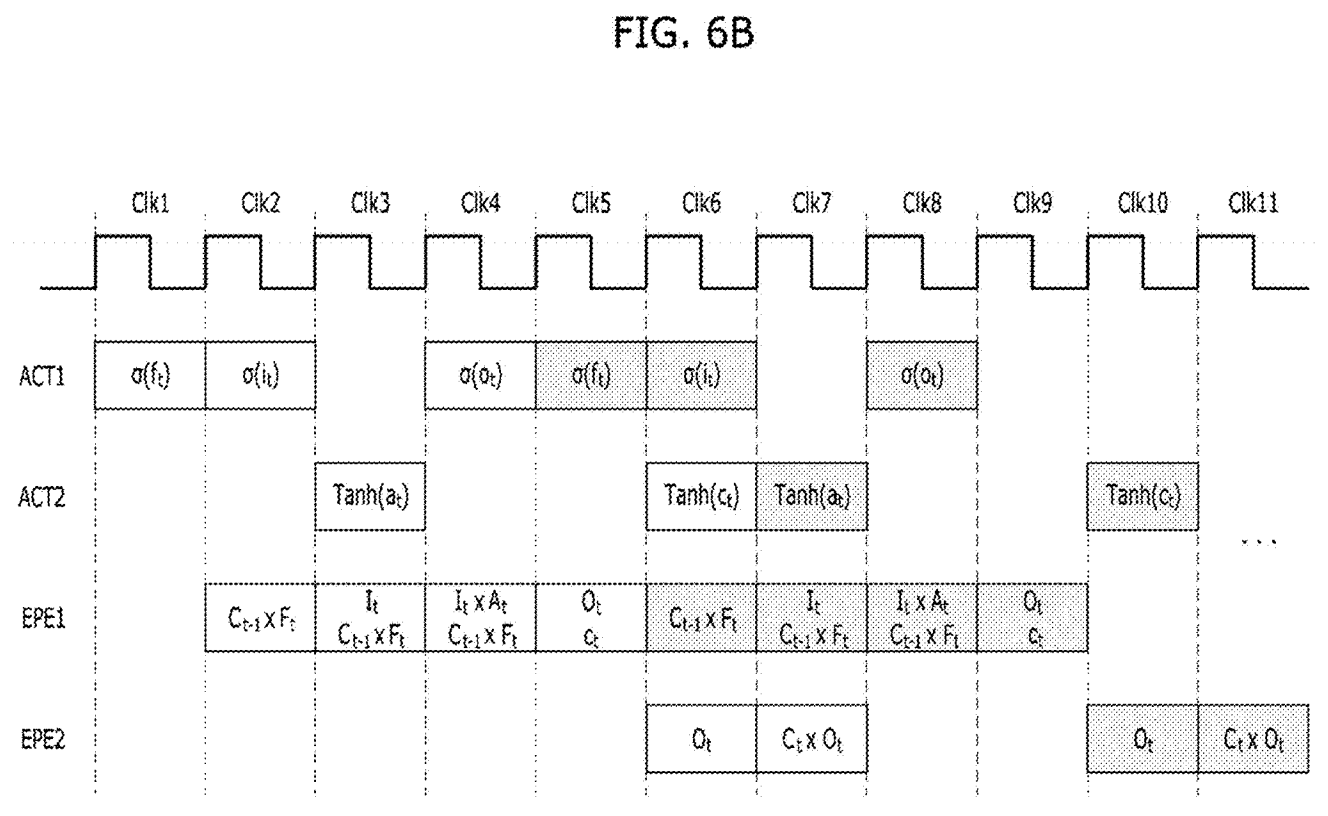

FIG. 6A is a diagram illustrating an example in which the element-wise operation is performed in the element-wise operation processing group 150A of FIG. 5, with data paths not used in the element-wise operation hidden. FIG. 6B is a timing diagram illustrating outputs of components of the element-wise operation processing group 150A during the clock cycles when the element-wise operation is performed. In FIG. 6B, activated versions of values are referred to using a corresponding capital letter; for example, the activation of the 'i$_t$' value is referred to as I$_t$.

Referring to FIG. 6A and FIG. 6B, in the first clock period Clk1, the 'f$_t$' value is inputted from the processing unit PE to the first activation subunit ACT1 of the activation unit ACT and the activated 'f$_t$' value F$_t$ (equal to WO in this example) is provided from the first activation subunit ACT1 to the first element-wise operation processing unit EPE1, and the cell state value C$_{t-1}$ (for example, the previous cell state value) is simultaneously transferred from the memory 200 to the first element-wise operation processing unit EPE1.

In the second clock period Clk2, the 'i$_t$' value is inputted from the processing unit PE to the first activation subunit ACT1 of the activation unit ACT and the activated 'i$_t$' value I$_t$ (equal to σ(i$_t$) in this example) is provided from the first activation subunit ACT1, and the first element-wise operation processing unit EPE1 performs an element multiplication operation on the cell state value C$_t$ and the activated 'f$_t$' value F$_t$.

In the third clock period Clk3, the activated 'i$_t$' value I$_t$ is provided to the first element-wise operation processing unit EPE1 and the 'a$_t$' value is inputted from the processing unit PE to the second activation subunit ACT2 of the activation unit ACT to produce the activated 'a$_t$' value A$_t$ (equal to Tanh(a$_t$) in this example).

In the fourth clock period Clk4, the activated 'a$_t$' value A$_t$ is provided to the first element-wise operation processing unit EPE1 and the first element-wise operation processing unit EPE1 performs an element multiplication operation on the activated 'i$_t$' value I$_t$ and the activated 'a$_t$' value A$_t$. Furthermore, the first element-wise operation processing unit EPE1 performs an element addition operation on a result value of the element multiplication operation of the activated 'i$_t$' value I$_t$ and the activated 'a$_t$' A$_t$ and a result value of the element multiplication operation of the cell state value C$_t$ and the activated 'f$_t$' value F$_t$, thereby calculating the current cell state value c$_t$. At the same time, the 'o$_t$' value is inputted from the processing unit PE to the first activation subunit ACT1 and the activated 'o$_t$' value O$_t$ (equal to σ(o$_t$) in this example) is thereby provided from the first activation subunit ACT1.

In the fifth clock cycle Clk5, the activated 'o$_t$' value O$_t$ and the calculated current cell state value c$_t$ are provided to the first element-wise operation processing unit EPE1.

In the sixth clock cycle Clk6, the activated 'o$_t$' value O$_t$ is provided to the second element-wise operation processing unit EPE2, and the current cell state value c$_t$ is inputted to the second activation subunit ACT2 of the activation unit ACT to produce the activated current cell state value C$_t$ (equal to Tanh(c$_t$) in this example).

In the seventh clock cycle Clk7, the second element-wise operation processing unit EPE2 performs an element multiplication operation on the activated 'o$_t$' value O$_t$ and the activated current cell state value C$_t$, thereby calculating the final output value h$_t$.

Such an operation process may be performed continuously and repeatedly. For example, the 'f$_t$', the 'i$_t$', the 'a$_t$', and the 'o$_t$' inputted to the activation unit ACT every clock from the first clock cycle Clk1 to the fourth clock cycle Clk4 may also be sequentially inputted every clock from the fifth clock cycle Clk5 to the eighth clock cycle Clk8. Accordingly, the shaded blocks in the fifth through eleventh clock cycles Clk5 through Clk11 illustrate portions of a second LSTM operation that respectively correspond to the unshaded blocks in the first to seventh clock cycles Clk1 though Clk7 that illustrate portions of a first LSTM operation.

Figure 7A:
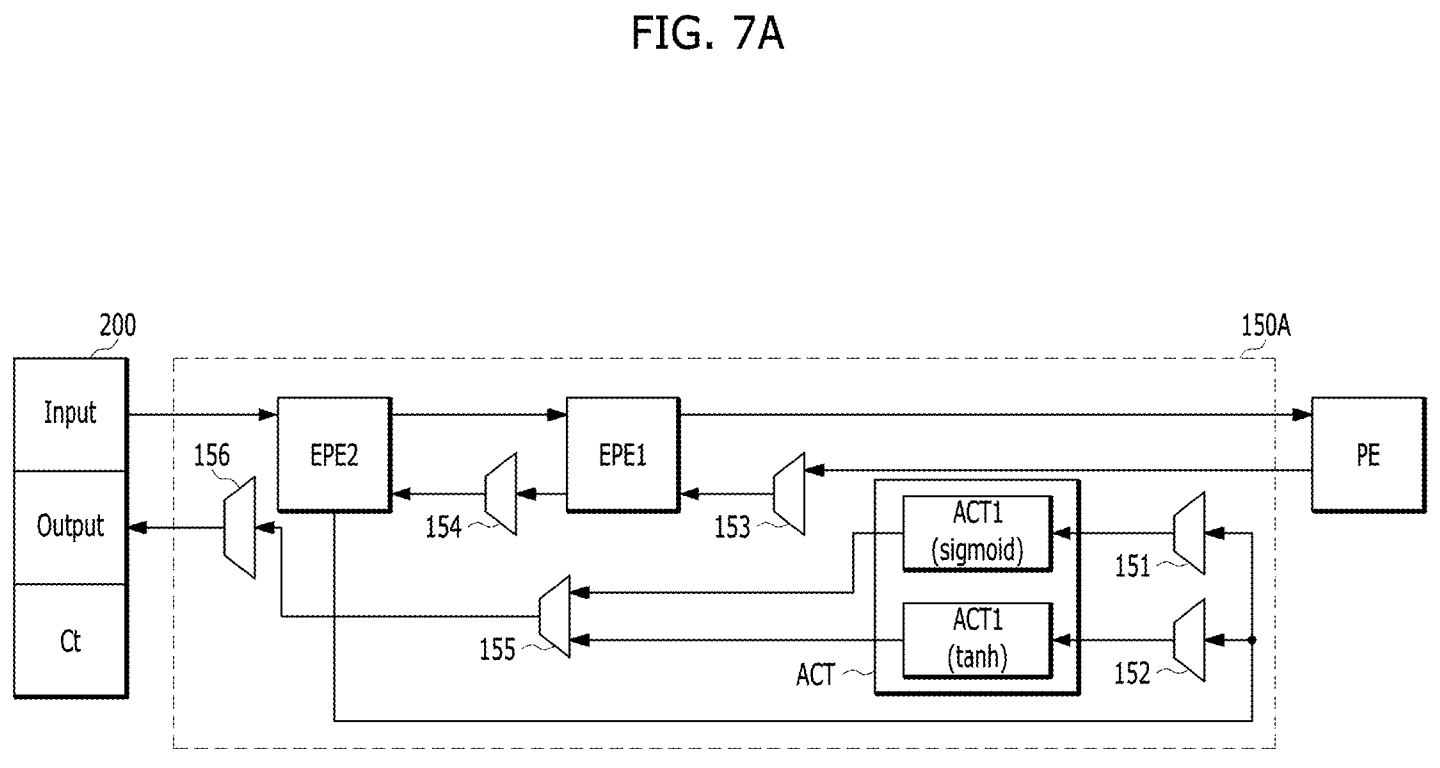
Figure 7B:
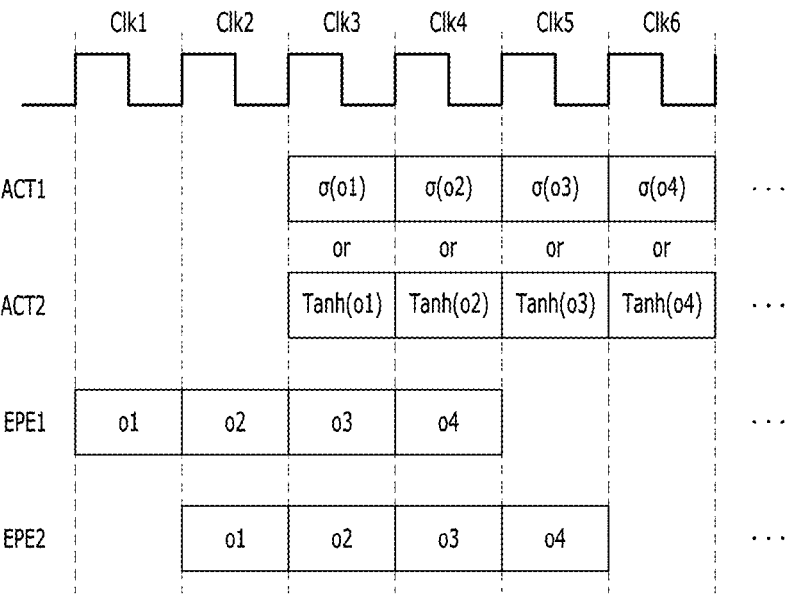
FIG. 7B is a timing diagram illustrating operation of the element-wise operation processing group when no element-wise operation is performed.

FIG. 7A is a diagram illustrating an example in which no element-wise operation is performed in the element-wise operation processing group 150A of FIG. 5, with data paths not used in the element-wise operation hidden. FIG. 7B is a timing diagram illustrating when no element-wise operation is performed. FIG. 7B illustrates only a process in which the final output value for the output data transferred from the first processing block 110 (FIG. 2) is transferred to the memory 200.

The input data Input may be transferred from the memory 200 to the second element-wise operation processing unit EPE2, the second element-wise operation processing unit EPE2 may transfer the received input data Input to the first element-wise operation processing unit EPE1, and the first element-wise operation processing unit EPE1 may transfer the received input data Input to a corresponding processing unit PE located on the leftmost side thereof among the processing units PEs in the first processing block 110 (FIG. 2).

Referring to FIG. 7A and FIG. 7B, in the first clock cycle Clk1, first output data o1 may be transferred from the processing unit PE to the first element-wise operation processing unit EPE1.

In the second clock cycle Clk2, the first element-wise operation processing unit EPE1 may transfer the first output data o1 to the second element-wise operation processing unit EPE2. At the same time, second output data o2 may be transferred from the processing unit PE to the first element-wise operation processing unit EPE1.

In the third clock cycle Clk3, the first element-wise operation processing unit EPE1 may transfer the second output data o2 to the second element-wise operation processing unit EPE2 and the second element-wise operation processing unit EPE2 may transfer the first output data o1 to the activation unit ACT. At the same time, third output data o3 may be transferred from the processing unit PE to the first element-wise operation processing unit EPE1 and the second output data o2 may be transferred to the second element-wise operation processing unit EPE2.

Furthermore, the activation unit ACT may perform an activation operation on the first output data o1 transferred from the second element-wise operation processing unit EPE2. Then, the activated first output data o1 may be stored in the memory 200 as final output data Output.

As described above, when the element-wise operation processing group performs no element-wise operation, the first and second element-wise operation processing units EPE1 and EPE2 included in the element-wise operation processing group operate in substantially the same manner as the processing units PEs included in the first processing block 110 (FIG. 2). Consequently, even when executing a neural network algorithm requiring no element-wise operation, it is possible to substantially prevent resources of the processing units PEs from being wasted.

The present disclosure has been described through specific embodiments, but it will be understood that the present disclosure may be modified in various ways without departing from its scope. Therefore, the scope of the present disclosure should not be limited to the aforementioned embodiments and should be defined by the claims to be described below and equivalents thereof. It will be understood that the structure of the present disclosure may be various corrected or modified without departing the scope or technical spirit of the present disclosure.

What is claimed is:

1. A neural network computation apparatus comprising:
a systolic array comprising:
a first processing block including a plurality of multiplication processing circuits that each perform a matrix multiplication operation on input data and weights; and
a second processing block including a plurality of element-wise operation processing circuits, each element-wise operation processing circuit distinguished from the multiplication processing circuits by comprising elements for performing an element-wise operation that are not present in each of the multiplication processing circuits, and each element-wise operation processing circuit is configured to:
receive the input data from a circuit disposed to the left thereof,
provide first output data to a circuit disposed to the right thereof,
receive the weights from a circuit disposed above thereof, and
receive second output data from the circuit disposed to the right thereof,
wherein each of the element-wise operation processing circuits selectively perform a first neural network computation operation and a second neural network computation operation,
wherein the first neural network computation operation comprises the matrix multiplication operation on the input data and the weights and a first activation operation on a result value of the matrix multiplication operation, and
wherein the second neural network computation operation comprises a second activation operation on the result value of the matrix multiplication operation, which is transferred from the first processing block, and the element-wise operation.

2. The neural network computation apparatus according to claim 1, wherein, when the neural network computation apparatus executes a neural network algorithm requiring the element-wise operation, the second processing block performs the second neural network computation operation.

3. The neural network computation apparatus according to claim 2, wherein a neural network algorithm requiring the element-wise operation includes a long short-term memory (LSTM) algorithm.

4. The neural network computation apparatus according to claim 1, wherein, when the neural network computation apparatus executes a neural network algorithm requiring no element-wise operation, the second processing block performs the first neural network computation operation.

5. The neural network computation apparatus according to claim 4, wherein the neural network algorithm requiring no element-wise operation includes a multi-layer perceptron (MLP) and a convolutional neural network (CNN).

6. The neural network computation apparatus according to claim 1, wherein each of the element-wise operation processing circuits of the second processing block comprises:
a first element-wise operation processing unit configured to transfer the second output data, which is transferred from the first processing block, to an adjacent element-wise operation processing unit and configured to update a cell state value based on the second output data transferred from the first processing block to produce an updated cell state value;
a second element-wise operation processing unit configured to perform one operation selected from a third operation of transferring the second output data, which is transferred from the first element-wise operation processing unit, to a memory and a fourth operation of calculating a final output value based on the updated cell state value; and
an activation unit configured to perform an activation operation on the second output data transferred from the first processing block and configured to perform an activation operation on the first output data and the updated cell state value.

7. The neural network computation apparatus according to claim 6, wherein, when the neural network computation apparatus executes a neural network algorithm requiring the element-wise operation,
the activation unit performs the second computation a plurality of times and sequentially transfers a plurality of activation values to the first element-wise operation processing unit and the second element-wise operation processing unit,
the first element-wise operation processing unit updates the cell state value by performing an element-wise operation on the activation values transferred from the activation unit and the cell state value, and transfers the updated cell state value to the activation unit, and
the second element-wise operation processing unit calculates the final output value by performing an element-wise operation on the activation values transferred from the activation unit and the updated cell state value.

8. The neural network computation apparatus according to claim 6, wherein, when the neural network computation apparatus executes a neural network algorithm requiring no element-wise operation,
the first element-wise operation processing unit transfers the second output data, which is transferred from a corresponding processing unit of the first processing block, to the second element-wise operation processing unit,
the second element-wise operation processing unit transfers the received second output data to the activation unit, and
the activation unit performs the activation operation on the second output data and transfers activation values to the memory.

9. The neural network computation apparatus according to claim 1, further comprising:
a weight fetcher interface configured to fetch the weights stored in a memory and transfer the fetched weights to the first processing block and the second processing block.

10. A neural network computation apparatus comprising:
a systolic array circuit in which a plurality of processing
  units that output an operation result for input data and
  weights are arranged in a matrix form,
wherein the systolic array circuit comprises:
  a plurality of first processing units each configured to
    perform a matrix multiplication operation on the
    input data and the weights; and
  a plurality of second processing units each configured
    to:
    perform the matrix multiplication operation on the
      input data and the weights and to perform an
      element-wise operation on output data transferred
      from the plurality of first processing units,
    receive input data from a circuit disposed to the left
      thereof,
    provide first output data to a circuit disposed to the
      right thereof,
    receive the weights from a circuit disposed above
      thereof, and
    receive second output data from the circuit disposed
      to the right thereof
  wherein each element-wise operation processing circuit
    is distinguished from the multiplication processing
    circuits by comprising elements for performing an
    element-wise operation that are not present in each
    of the multiplication processing circuits.

11. The neural network computation apparatus according
to claim 10, wherein the systolic array circuit further comprises:
  a plurality of activation units configured to perform
    activation operations on the second output data transferred
    from the plurality of first processing units or on
    the first output data transferred from the plurality of
    second processing units.

12. The neural network computation apparatus according
to claim 11, wherein, when the plurality of second processing units perform the matrix multiplication operations,
  each of the plurality of second processing units transfers
    the second output data, which is transferred from a
    corresponding first processing unit of the plurality of first processing units, to a second processing unit
    adjacent in a row direction, and
  a leftmost second processing unit located on the leftmost
    side thereof in the row direction transfers the second
    output data to the activation unit.

13. The neural network computation apparatus according
to claim 11, wherein, when the plurality of second processing units perform the element-wise operation,
  each of the plurality of activation units performs an
    activation operation on the second output data, which is
    transferred from a corresponding first processing unit
    of the plurality of first processing units, and transfers an
    activation value to a corresponding second processing
    unit of the plurality of second processing units, and
  each of the plurality of second processing units calculates
    an updated cell state value and a current final output
    value based on the activation value transferred from a
    corresponding activation unit of the plurality of activation
    units, a previous cell state value transferred from
    a memory, and a previous final output value.

14. The neural network computation apparatus according
to claim 13, wherein the plurality of second processing units
include a cell state value calculation group configured to
calculate the updated cell state value based on the activation
value and the previous cell state value, and a final output
value calculation group configured to calculate the current
final output value based on the updated cell state value and
the activation value.

15. The neural network computation apparatus according
to claim 11, wherein, when the neural network computation
apparatus executes a neural network algorithm including a
long short-term memory (LSTM), the plurality of second
processing units perform the element-wise operation.

16. The neural network computation apparatus according
to claim 11, wherein, when the neural network computation
apparatus executes a neural network algorithm including a
multi-layer perceptron (MLP) and a convolutional neural
network (CNN), the plurality of second processing units
perform the matrix multiplication operation.

\*   \*   \*   \*   \*